United States Patent
Naccache

(10) Patent No.: US 7,340,599 B2
(45) Date of Patent: Mar. 4, 2008

(54) METHOD FOR PROTECTION AGAINST FRAUD IN A NETWORK BY ICON SELECTION

(75) Inventor: David Naccache, Paris (FR)

(73) Assignee: Gemplus, Gemenos (FR)

( * ) Notice: Subject to any disclaimer, the term of this patent is extended or adjusted under 35 U.S.C. 154(b) by 855 days.

(21) Appl. No.: 10/398,732

(22) PCT Filed: Sep. 11, 2001

(86) PCT No.: PCT/FR01/02814

§ 371 (c)(1),
(2), (4) Date: Apr. 9, 2003

(87) PCT Pub. No.: WO02/31631

PCT Pub. Date: Apr. 18, 2002

(65) Prior Publication Data

US 2003/0191967 A1    Oct. 9, 2003

(30) Foreign Application Priority Data

Oct. 10, 2000   (FR) .................................. 00 12954

(51) Int. Cl.
*H04L 9/00* (2006.01)
*G06F 3/00* (2006.01)
(52) U.S. Cl. .................... 713/150; 715/762; 715/745; 715/716
(58) Field of Classification Search ................. 726/17, 726/21; 713/164, 150
See application file for complete search history.

(56) References Cited

U.S. PATENT DOCUMENTS

| 5,664,099 | A | 9/1997 | Ozzie et al. |
|---|---|---|---|
| 5,821,933 | A | 10/1998 | Keller et al. |
| 6,366,912 | B1* | 4/2002 | Wallent et al. ................. 707/9 |
| 6,804,786 | B1* | 10/2004 | Chamley et al. .............. 726/20 |
| 6,812,938 | B2* | 11/2004 | Pinnell ........................ 715/741 |
| 6,973,490 | B1* | 12/2005 | Robertson et al. .......... 709/224 |
| 2001/0030664 | A1* | 10/2001 | Shulman et al. ............ 345/835 |
| 2002/0055997 | A1* | 5/2002 | Pinnell ........................ 709/224 |
| 2002/0087479 | A1* | 7/2002 | Malcolm ...................... 705/64 |
| 2003/0028762 | A1* | 2/2003 | Trilli et al. ................. 713/153 |
| 2005/0086666 | A1* | 4/2005 | Nason et al. ................ 719/321 |

FOREIGN PATENT DOCUMENTS

| EP | 1239426 A2 * | 9/2002 |
|---|---|---|
| WO | WO 98/13778 | 4/1998 |

OTHER PUBLICATIONS

Peyrucat, Jean-Francois, "*Etiquettes Electroniques: Quand Les Produits Se Fichent D'eux Memos . . .* "; No. 602, Feb. 27, 1989, pp. 37-42, XP000050718, ISSN: 0755-219X.

* cited by examiner

*Primary Examiner*—Gilberto Barron, Jr.
*Assistant Examiner*—Virgil Herring
(74) *Attorney, Agent, or Firm*—Buchanan Ingersoll & Rooney PC

(57) ABSTRACT

To improve security of operations in a communication network such as Internet, a database containing a plurality of icons is stored in the installation program of a browser. When executing the installation program, an icon in the icon database is selected. The selected icon is stored in a storage unit which is inaccessible by any device other than the browser. The selected icon is displayed when executing the browser, and it is assigned a feature to indicate whether the current operation is secure.

13 Claims, 2 Drawing Sheets

METHOD FOR PROTECTION AGAINST FRAUD IN A NETWORK BY ICON SELECTION

This disclosure is based upon French Application No. 00/12954, filed on Oct. 10, 2000 and International Application No. PCT/FR01/02814, filed Sep. 11, 2001, the contents of which are incorporated herein by reference.

BACKGROUND OF THE INVENTION

The invention relates to networks which make it possible to perform secure transactions between the users of the network, in particular monetary transactions and, more particularly, on the Internet, a method for protection against fraud in order to prevent a fraudster from giving a user the impression that the transaction in progress is secure, this being, for example, with a view to extracting from said user confidential information such as a bank card number, or supplying the purchaser with inaccurate information.

On the Internet, more and more commercial sites offer secure transactions by using certificates which guarantee, to a certain extent, that the information the purchaser will enter on the screen on the site of the vendor cannot be "stolen" by a third party to the transaction. This is achieved by establishing a signed and/or encrypted communication between the vendor and the purchaser, for example using the SSL standard.

When a vendor site is secure for the transaction to be performed, this state made known to the purchaser by visual characteristics of the browser which consist of:

the appearance of a closed padlock at the bottom of the browser window, on the left, on the right or elsewhere according to the browser used; and the appearance, in the site address bar, of the letter "s" after "http" in order to obtain "https" at the beginning of the address.

For the purchaser, these visual characteristics are, in general, the only proofs that the transaction to be performed will be secure. Thus, a fraudster who wishes to "steal" the confidential information of a potential purchaser or, on the contrary, mislead them by presenting them with false information, must make these visual characteristics appear on their vendor site so as to give the impression that the transaction to be performed will be secure.

In the present state of operation of browsers, it is possible to make these visual security characteristics appear in the absence of any security by using a programming language, in particular those known by the names "Java" or "ActiveX".

This is because these languages make it possible to display, by means of an "applet", an image superimposed on that displayed by the browser and thus make the visual security characteristics appear with a view to deceiving the purchaser on the reality of the security.

In patent application No. 00 11801 filed by the Applicant on 15 Sep. 2000, a method was described for preventing the superimposition of this image or these images in certain parts of the browser screen, in particular in parts reserved for the visual security characteristics.

This superimposition is prevented by modifying the program of the browser or of the operating system or by the addition of a third program in order to determine whether the superimposed image affects these parts reserved for the visual security characteristics and to display an alarm message or take protective measures if such is the case.

In the case of the "Java" language, the modification of the program is performed in the part of the "Java" virtual machine relating to security by adding a new security rule.

More precisely, the method described in the aforementioned patent application comprises the following steps consisting in:

(a) determining at least one area of the screen where the superimposition of an image would lead to displaying to the visitor to the site erroneous information relating to the security of the transaction in progress;

(b) detecting if an image superimposition which is requested by a site being looked at covers all or part of said area;

(c) continuing the transaction if the result of step (b) is negative; or (d) undertaking a protective action such as displaying a warning message, disabling execution, making the content of the covered area appear again somewhere else, etc. if the result of step (b) is positive.

The method which has just been described is based on the fact that the area of the screen where the superimposition of an image would lead to displaying to the visitor to the site erroneous information relating to the security of the transaction in progress is known. Furthermore, the image which this area of the screen must contain is also known to all such as an open or closed padlock.

These two aspects have led fraudsters to perform superimpositions of security images such as the padlock in particular areas of the screen assigned to that end by the browser program.

SUMMARY OF THE INVENTION

According to the method of the present invention, it is arranged that the security image or icon cannot be known to a possible fraudster and, consequently, said fraudster cannot superimpose it.

This is achieved by allowing the user to choose, randomly or not, their security icon from an icon database during installation of the browser program. Moreover, the graphical information corresponding to the selected icon is made inaccessible to any applets and programs downloaded by the user. Finally, this icon will be displayed in a colour indicating the security status, for example "red" for a "non-secure" transaction, and "green" for a "secure" transaction.

The invention therefore relates to a method for improving the security of transactions between the sites and the visitors to the sites connected by a network which is accessible by means of a browsing program capable of displaying superimposed images on the display screen coming from the site being looked at, characterised in that it comprises the following steps consisting in:

(a) creating in the browsing program installation program a database containing a plurality of icons;

(b) selecting, during execution of the installation program, an icon from said icon database;

(c) recording this selected icon in a memory which is inaccessible to means other than those of the browsing program;

(d) displaying this selected icon during execution of the browsing program and assigning a characteristic to it for indicating that the operation in progress is or is not secure.

The memory where the icon is recorded is of the non-volatile type, such as the hard disk of the network access device; it is accessible to the browsing program but made inaccessible to means other than those of the browsing program.

The number of icons is very high, for example a million and more. Selection of the icon can be made randomly.

According to the invention, the position of the icon location on the screen can also be selected from amongst a number of positions or according to a random selection.

The characteristic indicating the security state of the operation in progress can consist of a different colour depending on whether the state of the operation is secure or not, or a flashing of the icon in the case of a non-secure state and the absence of flashing in the secure state.

The secure state can also be made known by the presence of the selected icon in a given location, its absence—a blank—indicating a non-secure state.

The invention also relates to a network access device, characterised in that it uses the method for improving the security of transactions as defined above.

BRIEF DESCRIPTION OF THE DRAWINGS

Other characteristics and advantages of the present invention will emerge from a reading of the following description of one particular embodiment, said description being given in connection with the accompanying drawings in which.

DETAILED DESCRIPTION

On the Internet, for searching for information, use is made of programs referred to as "browsers" such as those known by the names "Netscape" and "Internet Explorer". These browsers cause the display of screens having a number of parts, each part being assigned to certain functionalities.

Figure 1:
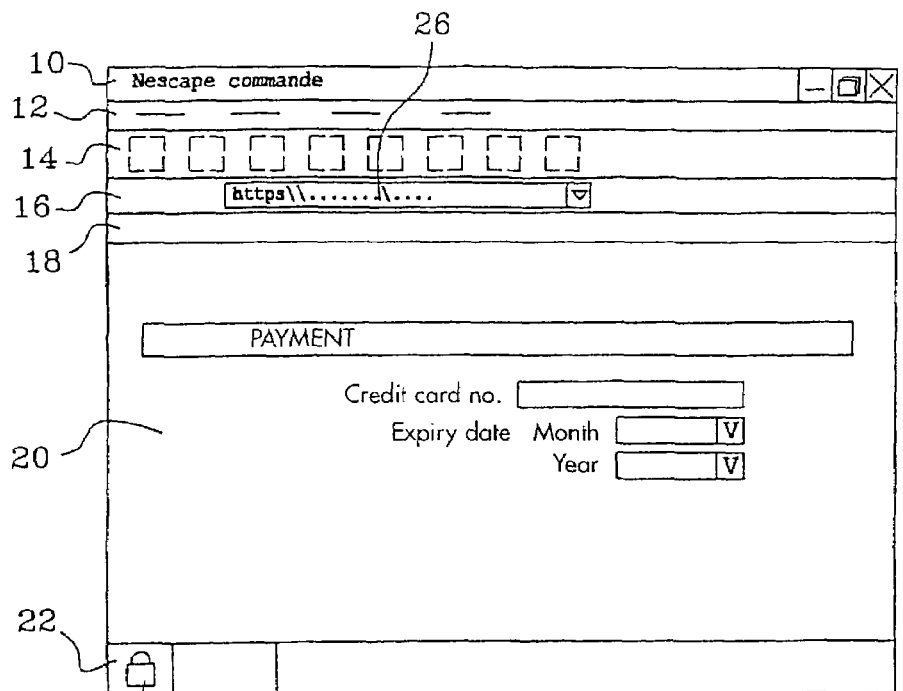
FIG. 1 is a simplified view of a browser screen showing that the monetary transaction to be performed will be secure.

FIG. 1 gives a simplified view of such a screen in the case where the user is requested to type their bank card number with a view to paying for a purchase.

This screen comprises seven parts or horizontal areas which are:
- a title bar 10;
- a menu bar 12;
- a first function bar 14;
- a second function bar 16 having in particular an address area 26;
- a third function bar 18;
- a browser window 20;
- a message bar 22 having in particular an area for a padlock 24.

Regarding a monetary transaction which must be secure, the security character is displayed as indicated in the introductory part, for example:
- by a closed padlock 24 in the area 22 at the bottom of the screen in the case of the browser known by the name Netscape;
- by the lower case letter "s" next to "http" in the area 16 and more particularly in the address 26 of the site.

This security character can also be displayed at any other place on the browser screen in the form of a window containing all the security information for the transaction in progress.

In the case of the browser known by the name Internet Explorer (FIG. 2), the closed padlock 28 is in the area 30 at the bottom of the screen but on the right.

Figure 2:
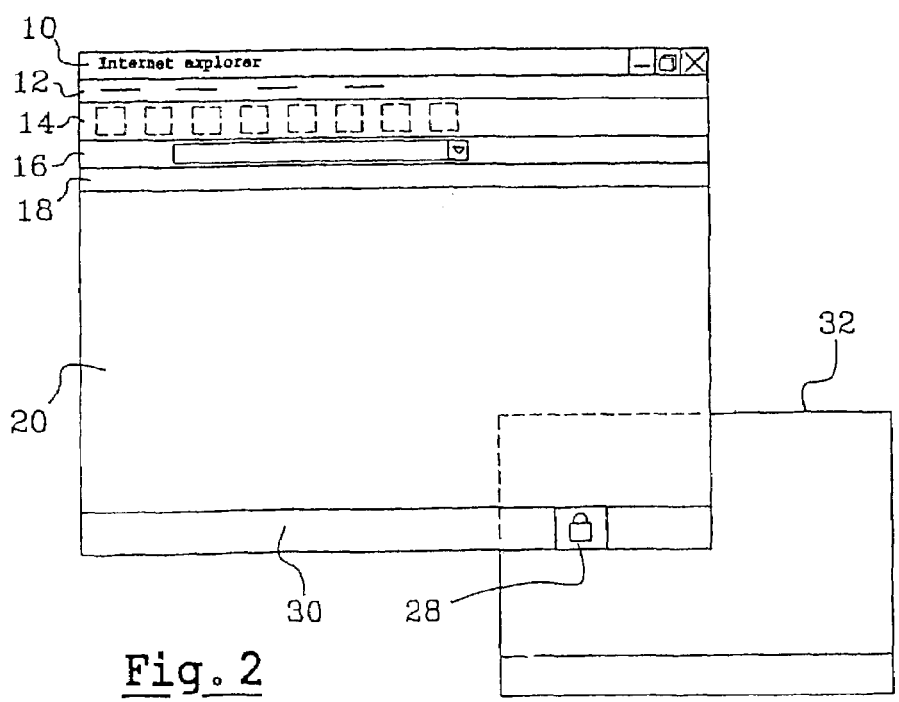
FIG. 2 is a simplified view of a browser screen showing a superimposed image giving the impression that the transaction is secure.

However, in the case of FIG. 2, the closed padlock 28 forms part of a superimposed image 32 which has the aim of giving the impression that the transaction is secure.

This superimposed image is obtained, for example, conventionally by an "applet" in "Java" language, or by any other language.

In order to perform such superimposition, the fraudster must know, on the one hand, the security image or icon—the padlock—and, on the other hand, the area of the screen where this icon must appear. A fraudster knows these two elements of the browser program since they are common to all users of the browser.

The method of the invention consists in arranging that these two elements, the icon and, optionally, the area of the screen where it is displayed, are not known and cannot be known to a possible fraudster.

To that end, during installation of the browser program by a user, a step of selecting a so-called security icon is provided in which the user can choose an icon from amongst a large number of icons, for example from a database of a million icons.

Instead of this free selection, a random selection can be provided which is carried out by the installation program.

This random factor of the icon graphic can be doubled by a second random factor, that of the position of the icon on the browser screen.

Following this selection, the graphical information of the icon assigned to the user is recorded in a memory which is made inaccessible to any downloaded applets and programs. This memory is of the non-volatile type, such as the hard disk of the access device, and is accessible to the browsing program but inaccessible to means other than those of the browsing program.

Furthermore, in a manner analogous to the open or closed padlock, this security icon will be for example "red" in colour for a "non-secure" operation and "green" in colour for a "secure" operation.

Besides the colour of the icon for indicating the security state, the invention makes provision for flashing of the icon if the state is non-secure, the absence of flashing being interpreted as a secure state.

The security characteristic can consist of the presence of the icon in a given position location to indicate the secure state, its absence in the location indicating the non-secure state.

The user of the browser program will become accustomed to this new icon so that a sudden change coming from a fraudster will inevitably attract their attention, which is the aim sought.

Furthermore, on account of this security icon not being known to a possible fraudster, they cannot create an applet which reproduces it.

Figure 3:
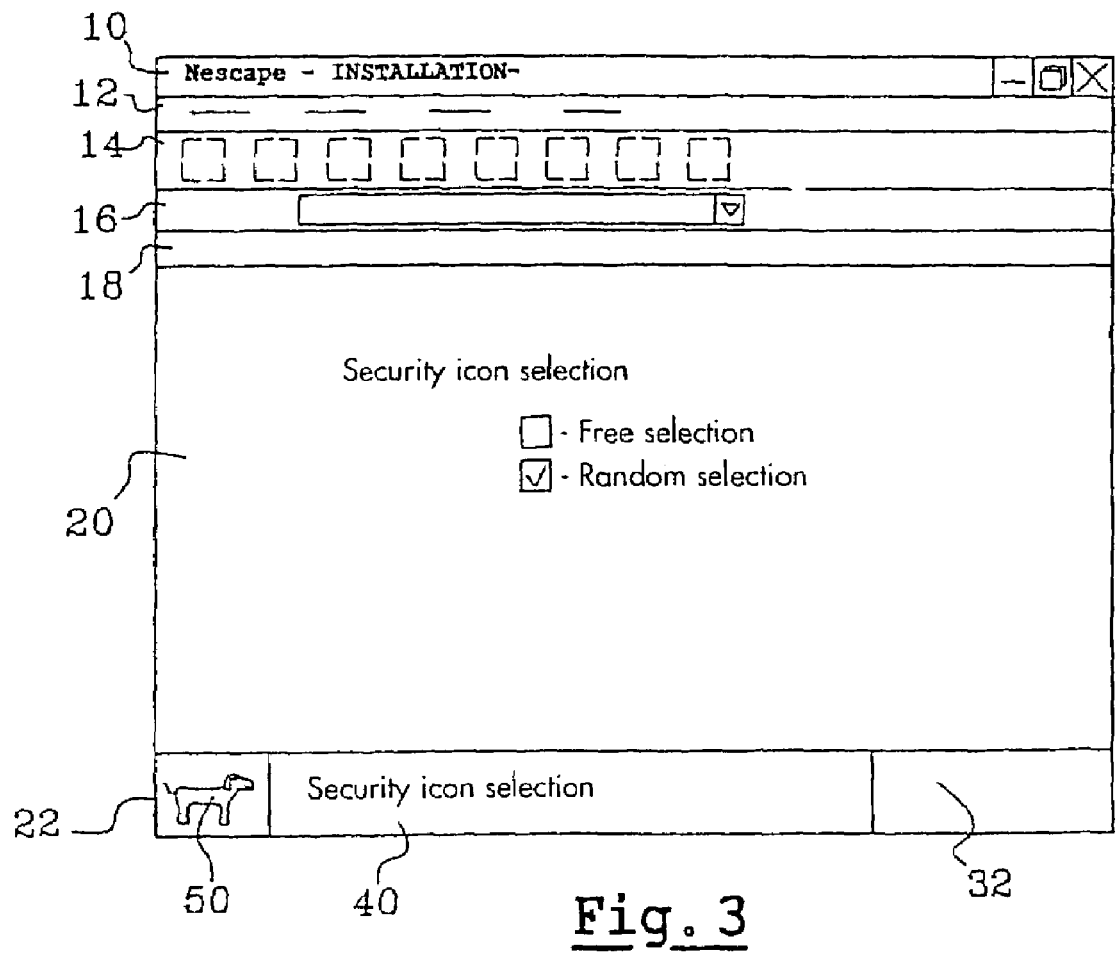
FIG. 3 is a simplified view of a screen during the operations for installing a browser program having characteristics of the present invention.

In order to make this selection of a security icon, the browser installation program makes a selection screen appear (FIG. 3) in which the user chooses, for example, between two types of selection:
- Free selection;
- Random selection.

In the case of free selection being chosen, the following screen displays an icon table, or a number of icon tables one following another, so as to allow the user to make their choice. As soon as the choice has been made, the icon 50 is displayed in the part 22, for example a guard dog.

In the case of random selection being chosen, the installation program randomly makes this choice of a security icon, the graphic 50 of which is displayed in the part 22. If the user does not like the graphic, they can restart this random selection until an icon accepted by them is obtained.

The above description illustrates that the steps of the method consist in:

(a) creating in the browsing program installation program a database containing a plurality of icons;

(b) selecting, during execution of the installation program, an icon from said icon database;

(c) recording this selected icon in a memory which is inaccessible to means other than those of the browsing program;

(d) displaying this selected icon during execution of the browsing program and assigning a characteristic to for indicating that the operation in progress is or is not secure.

The memory where the icon is recorded is of the non-volatile type, such as the hard disk of the network access device; it is accessible to the browsing program but made inaccessible to means other than those of the browsing program.

The invention also provides for the selection, random or not, of the position of the icon location on the screen from amongst a number of positions. This selection of the position of the icon location can be implemented during step (b), before or after selection of the icon.

The invention claimed is:

1. A method for improving the security of transactions between network sites and the visitors to the sites by means of a browsing program capable of displaying superimposed images on a display screen from the site being visited, comprising the following steps:
   (a) providing a database containing a plurality of icons in an installation program for the browser;
   (b) selecting, during execution of the installation program, an icon from said icon database;
   (c) recording the selected icon in a memory which is inaccessible to means other than the browsing program; and
   (d) displaying the selected icon during execution of the browsing program with a characteristic that indicates whether an operation in progress is secure.

2. A method according to claim 1, wherein the number of icons in the database is of the order of a million or more.

3. A method according to claim 1 wherein the selection of an icon is made randomly by the installation program.

4. A method according to claim 1, wherein said characteristic is a different colour of the icon depending on whether the state of the operation is secure or not.

5. A method according to claim 1, wherein said characteristic is a flashing of the icon in the non-secure state and the absence of flashing of the icon in the secure state.

6. A method according to claim 1, wherein said characteristic is the absence of the icon in a given position of the screen in the non-secure state and the presence of the icon in the secure state.

7. A method according to claim 1, wherein step (b) also comprises a step of selection of a position of the icon location on the screen.

8. A device for accessing a network to which sites and visitors to the sites are connected in order to perform transactions between them, said device including a memory in which is stored a browser installation program having a database containing a plurality of icons and which is responsive to selection of one of said icons to cause said device to perform the following operations:
   recording the selected icon in a memory which is inaccessible to means other than the browsing program; and
   displaying the selected icon during execution of the browsing program with a characteristic that indicates whether an operation in progress is secure.

9. An access device according to claim 8, wherein the memory where the selected icon is recorded is of the non-volatile type.

10. An access device according to claim 9, wherein the non-volatile type memory is a hard disk of the access device.

11. An access device according to claim 8, wherein said characteristic is a different colour of the icon depending on whether the state of the operation is secure or not.

12. An access device according to claim 8, wherein said characteristic is a flashing of the icon in the non-secure state and the absence of flashing of the icon in the secure state.

13. An access device according to claim 8, wherein said characteristic is the absence of the icon in a given position of the screen in the non-secure state and the presence of the icon in the secure state.

* * * * *